Oct. 12, 1954     R. A. FISCHER     2,691,516
CENTRIFUGAL SNAP-ACTION MECHANISM
Filed Dec. 31, 1949     3 Sheets-Sheet 1
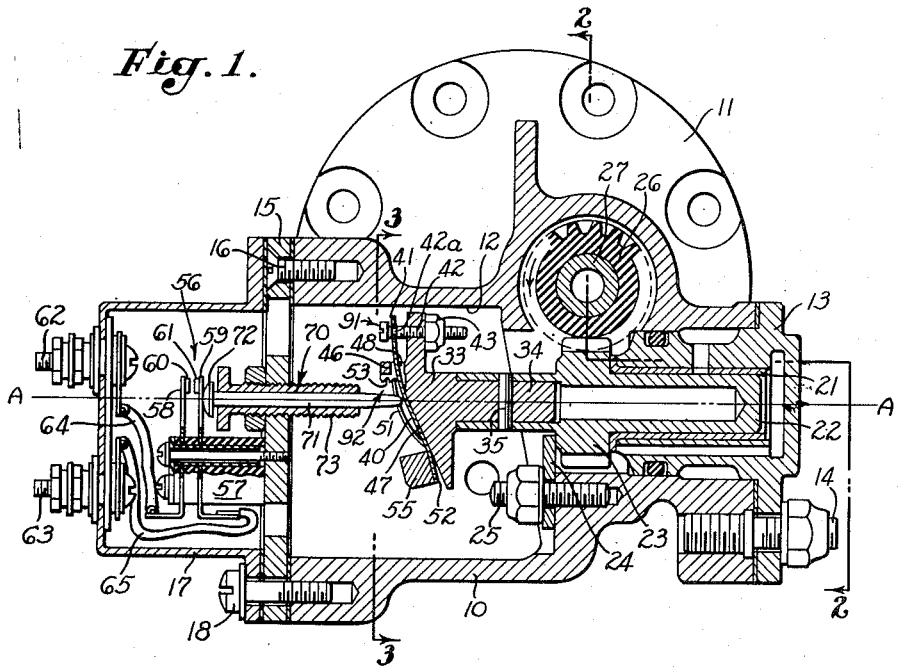
Fig. 1.
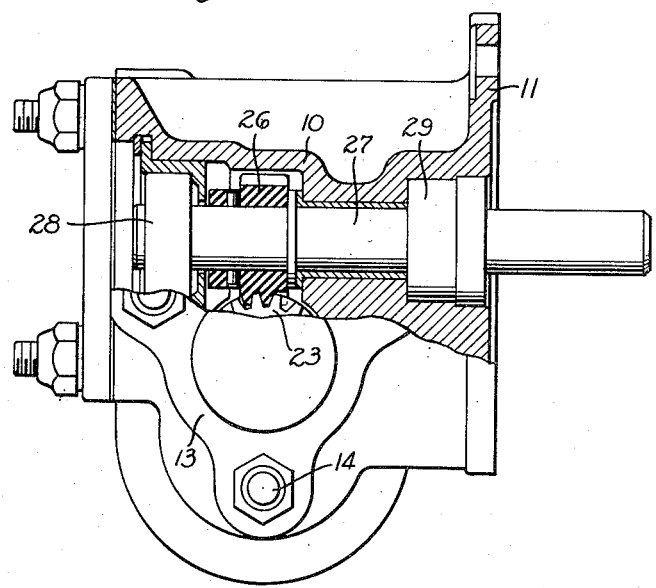
Fig. 2.
INVENTOR.
RICHARD A. FISCHER
BY HIS ATTORNEYS.
HARRIS, KIECH, FOSTER & HARRIS
BY 

Oct. 12, 1954 R. A. FISCHER 2,691,516
CENTRIFUGAL SNAP-ACTION MECHANISM
Filed Dec. 31, 1949 3 Sheets-Sheet 2

INVENTOR.
RICHARD A. FISCHER
BY HIS ATTORNEYS.
HARRIS, KIECH, FOSTER & HARRIS
BY
Ward D Foster Oct. 12, 1954    R. A. FISCHER    2,691,516
CENTRIFUGAL SNAP-ACTION MECHANISM
Filed Dec. 31, 1949    3 Sheets-Sheet 3

INVENTOR.
RICHARD A. FISCHER
BY HIS ATTORNEYS.
HARRIS, KIECH, FOSTER & HARRIS

Patented Oct. 12, 1954

2,691,516

UNITED STATES PATENT OFFICE 2,691,516

CENTRIFUGAL SNAP-ACTION MECHANISM

Richard A. Fischer, Los Angeles, Calif., assignor to The Garrett Corporation, Los Angeles, Calif., a corporation of California Application December 31, 1949, Serial No. 136,345

9 Claims. (Cl. 264—3)

My invention relates in general to snap-action mechanisms and a primary object thereof is to provide a snap-action mechanism which is centrifugally operated.

More specifically, an object of the invention is to provide a device which includes a snap-action mechanism and which includes means for applying a centrifugal force to the mechanism to operate it.

Still more specifically, an object of the invention is to provide a device which includes a snap-action mechanism carrying a weight and which includes means for rotating the mechanism and the weight about an axis such that a centrifugal force is applied to the weight to operate the snap-action mechanism.

Another object is to provide a device of the foregoing character which includes a support, an arm which is pivotally connected at one end to the support and which is free to move relative to the support at its other end, a weight carried by the arm, spring means for biasing the arm in one direction relative to the support, and means for rotating the support about an axis such that a centrifugal force is applied to the weight carried by the arm to bias the arm in the opposite direction relative to the support.

Still another object is to provide such a device wherein the axis of rotation of the support makes an angle of less than 90° with a reference line extending from the point of pivotal connection of the arm to the combined center of gravity of the arm and the weight so that a centrifugal force applied to the arm is developed upon rotation of the support.

A further object is to provide two stops carried by the support and respectively disposed on opposite sides of the arm to limit movement of the arm relative to the support, the arm being biased toward one of the stops by the spring force applied thereto by the spring means and the arm being biased toward the other of the stops by the centrifugal force developed upon rotation of the support.

Another object is to provide a device wherein the spring means comprises a leaf spring which is in longitudinal compression and which is connected at one end to the arm and at its other end to the support. More specifically, an object in this connection is to provide a spring means wherein the leaf spring is connected to the free end of the arm and is pivotally connected to the support intermediate the ends of the arm.

Still another object is to provide a device of the character set forth which includes a stationary switch spaced from the rotatable support and which includes actuating means operatively connecting the aforementioned arm of the snap-action mechanism and the switch for actuating the switch.

Another object is to provide stationary resilient means spaced from the rotatable support and acting on the aforementioned actuating means for opposing the centrifugal force applied to the arm of the snap-action mechanism and for aiding the spring force applied thereto by the aforementioned spring means.

An object in connection with one embodiment of the invention is to provide a device wherein the resilient means which acts on the arm of the snap-action mechanism through the aforementioned actuating means is incorporated in the switch.

An object in connection with another embodiment of the invention is to provide a device wherein the resilient means acting on the arm of the snap-action mechanism through the aforementioned actuating means is independent of the switch.

As will be apparent, a device embodying the fundamental principle of the invention as outlined by the foregoing objects is responsive to the rotational speed of the support and operates whenever the rotational speed of the support reaches a critical value such that the centrifugal force applied to the arm of the snap-action mechanism exceeds the spring force applied thereto. The device may be employed wherever response to a predetermined critical rotational speed is desired, one possible use of the device being to prevent overspeeding of an apparatus with which it is associated, in which case the device acts as a governor. For example, the aforementioned switch may be employed to operate some means for interrupting, or decreasing, the delivery of fuel to an engine whenever the switch is actuated by the snap-action mechanism. However, it will be understood that the utility of the device is not limited to a governing action. Also, for other applications of the device, it will be understood that the actuating means operatively connecting the arm of the snap-action mechanism to the switch may be employed to operate an element other than a switch, if desired.

As indicated above, the device of the invention is responsive to a predetermined critical rotational speed and an important object of the invention is to provide adjusting means for varying the critical rotational speed to which the device is responsive.

The foregoing objects and advantages of the present invention, together with various other objects and advantages thereof which will become apparent, may be attained through the utilization of the exemplary embodiments of the invention which are illustrated in the accompanying drawings and which are described in detail hereinafter. Referring to the drawings:

Fig. 1 is a longitudinal sectional view of a device which embodies the centrifugally-operated snap-action mechanism of the invention;

Fig. 2 is a view which is partly in transverse section and which is taken along the broken line 2—2 of Fig. 1;

Figure 3:
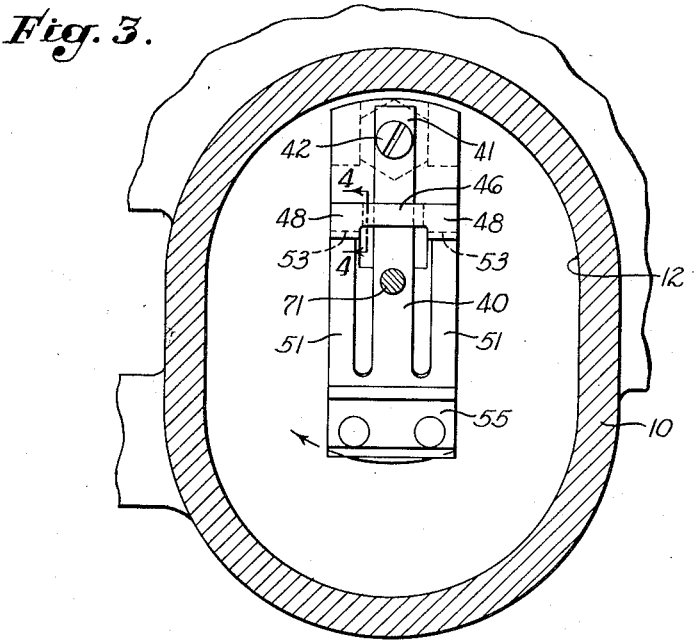
Fig. 3 is a transverse sectional view which is taken along the broken line 3—3 of Fig. 1.

Referring particularly to Figs. 1 and 2, the numeral 10 designates a housing having a mounting flange 11 for attachment to an apparatus with which the invention is associated. The housing 10 provides a chamber 12 which is open at its ends, one end of the chamber being closed by a plug-like closure 13 which is connected to the housing by bolts 14 and the other end of the chamber being closed by a plate-like closure 15 which is connected to the housing by screws 16. A cup-like housing element 17 is attached to the housing 10 over the closure 15 by screws 18.

Pressed into a bore in the plug-like closure 13 is a bearing 21 for a shaft 22 having a gear 23 thereon, the shaft being retained in the bearing by a thrust plate 24 which engages the gear 23 and which is secured to the housing 10 by one or more bolts 25. Meshed with the gear 23 on the shaft 22 is a gear 26 on a cross shaft 27 which is mounted in bearings 28 and 29 and which projects from the housing 10 at one end, the meshing of the gears 23 and 26 being illustrated diagrammatically. The projecting end of the cross shaft 27 may be operatively connected in any suitable manner to an apparatus with which the invention is associated so that such apparatus drives the shaft 22 through the cross shaft 27 and the gears 23 and 26. It will be understood that the particular driving means shown for the shaft 22 is merely illustrative and that the shaft 22 may be driven in any desired manner by the apparatus with which the invention is associated.

Considering the invention in more detail, it includes a support 33 having a stem 34 which is disposed in a bore in the shaft 22 and which is retained therein by a pin 35 so that the support rotates with the shaft 22 about the axis of rotation A—A thereof. Mounted on the support 33 is a snap-action mechanism which includes an arm 40, the latter being a tension member of the mechanism and being illustrated as a leaf spring. One end 41 of the arm 40 is connected to the support 33 on one side of the axis of rotation A—A by means of a screw 42 which is threaded through an opening in the support and secured by a nut 43. The screw 42 extends through an opening in the end 41 of the arm 40 which is slightly enlarged relative to the diameter of the screw adjacent the head thereof, the screw 42 having a reduced neck 42a adjacent its head which is disposed in the opening in the end 41 of the arm. This construction produces the effect of an adjustable pivotal connection between the arm 40 and the support 33, which effect is enhanced by the flexibility of the leaf spring preferably employed for the arm 40. It will of course be apparent that the arm 40, conveniently a leaf spring, is nevertheless fundamentally a tension member and need not be a leaf spring, but may be a wire, chain, cable, or the like. It will be understood that, by employing a flexible member for the arm 40, the effect of a pivotal connection between the arm and the support 33 will be attained even if the end 41 of the arm is connected to the support 33 in cantilever fashion.

The support 33 carries stops 46 and 47 for limiting pivotal movement of the arm 40 relative to the support, the stops being disposed on opposite sides of the arm. As best shown in Figs. 1 and 3, the stop 46 is formed by a bridge which spans and is formed integrally with lugs 48 on the support 33. The stop 47 is formed by a surface of the support 33 which would, if extended, intersect the axis of the screw 42 at a point outwardly of the head of the screw. Consequently, when the arm 40 is biased toward the stop 47 in a manner to be described, the arm first contacts the end of the surface defining the stop 47 which is nearest the screw 42, the arm thereafter flexing as it is biased into engagement with the stop 47, which is the normal position of the arm. Thus, with this construction, the pivoted end 41 of the arm 40 is biased into engagement with the neck 42a of the screw 42 when the arm 40 is in its normal position so as to fix the point of pivotal connection of the pivoted end 41 relative to the screw. It will be understood that the surface of the support 33 may be formed so that only that portion of the arm 40 distal of its pivoted end 41 engages the stop 47 when the arm is biased thereto. In that event the arm 40 would not be bowed in the manner shown in Figs. 1 and 7.

Figure 4:
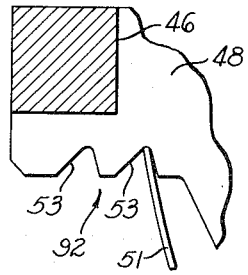
Fig. 4 is an enlarged, fragmentary sectional view which is taken along the broken line 4—4 of Fig. 3.

The arm 40 is biased toward the stop 47 by a compression spring means which includes a pair of leaf springs 51. The springs 51 are disposed on opposite sides of the arm 40 and are connected to the free end 52 of the arm, preferably by being formed integrally therewith as best shown in Fig. 3. It will be noted that, in the particular construction illustrated, the free end 52 of the arm 40 is disposed on the opposite side of the axis A—A from the pivoted end 41 of the arm. The opposite ends of the springs 51 are pivotally connected to the support 33 by being disposed in notches 53 in the lugs 48 on the support, as best shown in Figs. 1 and 4, the points of pivotal connection of the springs to the support being intermediate the pivoted and free ends 41 and 52 of the arm 40 and being disposed on one side of the arm when the latter is in its normal position. The length of the springs 51 is greater than the distance between their points of pivotal connection to the lugs 48 and their points of connection to the arm 40 so that they are in longitudinal compression. When the arm 40 is in its normal position, the springs 51 are bowed as illustrated to bias the arm toward the stop 47.

As will be apparent, the arm 40 and the springs 51 cooperate to provide a snap-action mechanism which is more or less conventional, motion of the mechanism being limited by the stops 46 and 47. In the particular construction illustrated, the stop 46 is so located relative to the points of pivotal connection of the springs 51 to the support 33 that the snap-action mechanism does not move over center as the arm 40 moves from the stop 47 to the stop 46, i. e., is so located that the arm 40 does not traverse the points of pivotal connection of the springs to the support. Thus, the springs 51 continually bias the arm 40 toward the stop 47. However, it will be understood that, if desired, the stop 46 may be so positioned relative to the points of pivotal connection of the springs 51 to the support that the snap-action mechanism does move over center in moving from the stop 47 to the stop 46 without departing from the spirit of the invention.

The snap-action mechanism is operable by a centrifugal force applied thereto in a direction to bias the arm 40 toward the stop 46 upon rotation of the support 33 about the axis A—A, the centrifugal force biasing the arm 40 toward the stop 46 and the spring force biasing the arm toward the stop 47 being in opposition. The centrifugal force is obtained by providing a weight 55 on the free end 52 of the arm 40 in the particular construction illustrated. In order to obtain the desired centrifugal force, it is necessary that the axis of rotation A—A of the support 33 make an angle of less than 90° with a reference line extending between the pivoted end 41 of the arm 40 and the combined center of gravity of the arm 40 and the weight 55, thereby providing a centrifugal force component in a direction generally parallel to the axis A—A. Since the arm 40 is substantially weightless as compared to the weight 55, the resultant center of gravity of the arm and the weight substantially coincides with the center of gravity of the weight per se.

In the particular application of the invention illustrated, the centrifugally-operated snap-action mechanism is employed to actuate a switch 56 which is disposed within the housing element 17, the switch 56 comprising a post 57 of insulating material which is mounted on the plate-like closure 15 of the housing 10. The switch also includes spring blades 58 and 59 which are mounted on the post 57 in cantilever fashion and which carry contacts 60 and 61, the contacts normally being spaced apart so that the switch is open. The blades 58 and 59 are connected to terminals 62 and 63 by wires 64 and 65, the terminals being mounted on the housing element 17.

The switch 56 is actuated by an actuating means 70 which operatively connects the centrifugally-actuated snap-action mechanism to the switch, the actuating means 70 comprising a plunger 71 one end of which is adapted to be engaged by the arm 40 of the snap-action mechanism and the other end of which is provided with a head 72 adapted to engage the switch blade 59. The plunger 71 is reciprocable in a tubular guide 73 which is threaded into the plate-like closure 15 of the housing 10. In the particular construction illustrated, the plunger 71 is normally spaced from the arm 40 to minimize wear, the arm being adapted to engage the plunger to close the switch 56 as the arm moves from the stop 47 toward the stop 46. The switch 56 is insulated relative to the snap-action mechanism in any suitable manner, as by making the plunger 71 of an insulating material.

Figure 5:
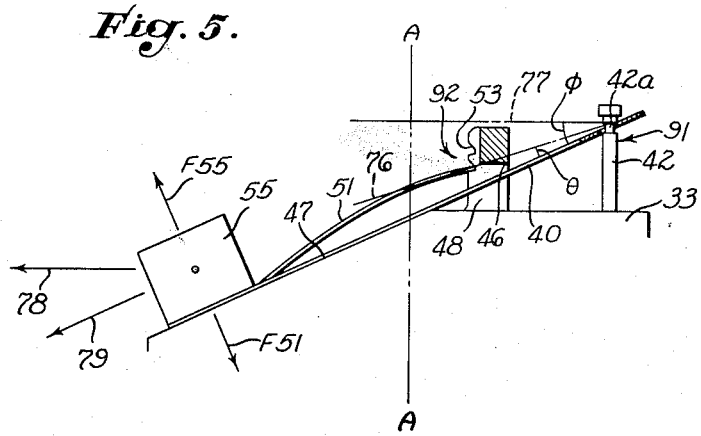
Fig. 5 is a diagrammatic view of the centrifugally-operated snap-action mechanism of the invention.
Figure 6:
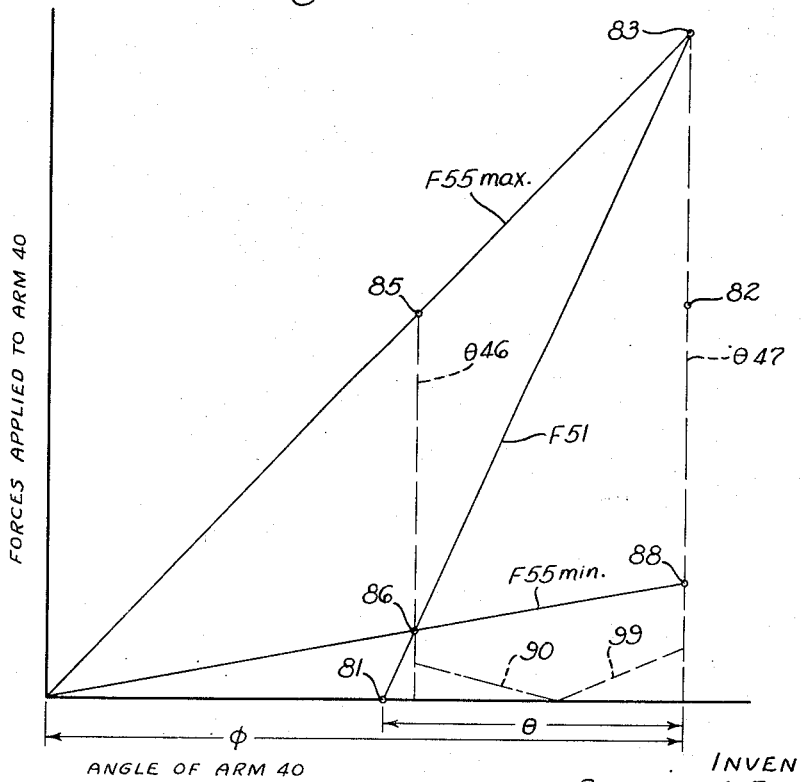
Fig. 6 is a diagram illustrating the operation of the centrifugally-operated snap-action mechanism of the invention.

The operation of the invention will now be considered with particular reference to Figs. 5 and 6 of the drawings. Referring first to Fig. 5, the reference character $\theta$ designates the angle through which the arm 40 moves in rotating from its on-center position, designated by the reference line 76, into its normal position wherein it engages the stop 47, the angle $\theta$ being regarded as zero when the arm is in its on-center position. However, in the particular construction illustrated, the angle $\theta$ can never attain a value of zero since the stop 46 prevents the arm 40 from attaining its on-center position. The reference character $\phi$ designates the angle between the arm 40 and a line 77 perpendicular to the axis of rotation A—A of the support 33 and intersecting the point of pivotal connection of the arm 40 to the support. The angle $\phi$ is zero at the perpendicular line 77 and is a maximum at the point where $\theta$ is a maximum.

Continuing to refer to Fig. 5, the springs 51 apply a spring force to the arm 40 which biases it toward the stop 47 as previously indicated, the spring force being designated by the arrow $F_{51}$. When the support 33 is rotated about the axis A—A, a centrifugal force, designated by the arrow 78, is applied to the weight 55 in a direction normal to the axis A—A. This centrifugal force may be resolved into a component 79 parallel to the arm 40 and a component $F_{55}$ perpendicular thereto, the centrifugal force component $F_{55}$ biasing the arm 40 toward the stop 46 and being opposed to the spring force $F_{51}$. As will be apparent, the arm 40 moves in the direction of the larger of the two forces $F_{51}$ and $F_{55}$ as will be discussed in more detail hereinafter.

Referring now to Fig. 6, the forces $F_{51}$ and $F_{55}$ applied to the arm 40 are graphically related to the angles $\phi$ and $\theta$ of the arm. As will be apparent, the value of $F_{51}$ is zero at the point 81 where $\theta$ is zero, i. e., at the on-center position of the arm 40. The value of $F_{51}$ increases with increases in the value of $\theta$ (or $\phi$) from the point 81 where $F_{51}$ and $\theta$ are equal to zero.

In Fig. 6, the relationship between $F_{55}$ and the angle of the arm 40 relative to the perpendicular 77 is illustrated graphically for two rotational speeds of the support 33, the force-angle relationship for the higher rotational speed being designated as $F_{55_{max}}$ and the relationship for the lower rotational speed being designated by $F_{55_{min}}$. As will be apparent, $F_{55_{max}}$ and $F_{55_{min}}$ are equal to zero when $\phi$ is zero and increase substantially linearly as $\theta$ (or $\phi$) increases.

In Fig. 6, the value of $\theta$ corresponding to the position of the arm 40 when it is in engagement with the stop 46 is illustrated graphically by the vertical dotted line $\theta_{46}$. Similarly, the value of $\theta$ corresponding to the normal position of the arm 40 wherein it engages the stop 47 is illustrated graphically by the vertical dotted line $\theta_{47}$. It will be noted that since, in the particular construction illustrated, the stop 46 prevents the arm 40 from reaching its on-center position wherein the value of $\theta$ is zero, the line $\theta_{46}$ intersects the horizontal axis of the graph at a value of $\theta$ which is greater than zero.

Considering the operation of the invention in connection with Fig. 6, it will be assumed that the device of the invention is operating at a point 82 on the line $\theta_{47}$. Under such conditions, the arm 40 is in engagement with the stop 47 and the support 33 is rotating at a speed such that $F_{51}$ exceeds $F_{55}$ so that the arm is continually biased into engagement with the stop 47. It will now be assumed that, with the foregoing conditions obtaining, the rotational speed of the support 33 is increased to a value such that $F_{55}$ increases to a point 83 which is located at the intersection of the line $F_{55_{max.}}$ and $F_{51}$. At this point $F_{55_{max.}}$ and $F_{51}$ are equal and opposed and the arm 40 may be said to be in a state of unstable equilibrium, whereby the application of a minute additional centrifugal force will cause the arm 40 to begin movement away from the stop 47. Such an additional force might be represented as a very slight force upwardly from the point 83 on the line $\theta_{47}$, the additional force being so small as to be incapable of illustration in Fig. 6. As aforesaid, the arm 40 begins movement away from the stop 47 thereby decreasing the angles $\phi$ and $\theta$.

As illustrated in Fig. 6, the slope of the line $F_{51}$ is greater than that of the line $F_{55_{max.}}$ so that, although both $F_{55}$ and $F_{51}$ decrease as $\theta$ (or $\phi$) decreases, $F_{51}$ decreases at a much higher rate than $F_{55}$. Consequently, once the arm 40 begins to move toward the stop 46, the force differential moving it toward the stop 46 increases rapidly so that the arm is moved from stop 47 to the stop 46 with a snap action, the maximum value of this force differential being attained when the arm engages the stop 46. The maximum value of this force differential is represented by the vertical distance between the points 85 and 86, the point 85 being at the intersection of the line $F_{55_{max.}}$ and the line $\theta_{46}$ and the point 86 being at the intersection of the lines $F_{51}$, $\theta_{46}$ and $F_{55_{min.}}$.

In view of the foregoing, it will be apparent that as soon as the centrifugal force $F_{55}$ increases to a value slightly higher than the spring force $F_{51}$, the arm 40 moves from the stop 47 to the stop 46 with a snap action because of the fact that the force differential available for moving it toward the stop 46 increases rapidly as it approaches this stop, all of this occurring without any necessity for any increase in the rotational speed of the support 33 above the critical value necessary to initiate movement of the arm. As previously indicated, movement of the arm 40 from the stop 47 to the stop 46 is communicated to the plunger 71 to close the switch 56 in the particular construction illustrated.

It will now be assumed that, with the arm 40 in engagement with the stop 46, the rotational speed of the support 33 decreases from the value corresponding to the line $F_{55_{max.}}$. As a result, the centrifugal force $F_{55}$ drops along the vertical line $\theta_{46}$. As long as the rotational speed of the support 33 is such that $F_{55}$ remains at a value higher than that indicated at the point 86, the arm 40 remains in engagement with the stop 46. When the rotational speed drops to a point where $F_{55}$ is equal to $F_{55_{min.}}$, and hence equal to $F_{51}$, the arm 40 is again in a state of unstable equilibrium, whereby a minute reduction of centrifugal force will cause the arm 40 to begin movement away from the stop 46. Such a force reduction might be represented as a very slight force downwardly from the point 86, the force reduction being so small as to be incapable of illustration in Fig. 6. As aforesaid, the arm 40 begins movement away from the stop 46, thereby increasing the angles $\phi$ and $\theta$. Consequently, since the slope of line $F_{51}$ is greater than that of $F_{55_{min.}}$, the force $F_{51}$ will increase at a greater rate than $F_{55_{min.}}$ and the arm 40 will therefore accelerate with a snap action from the stop 46 to the stop 47 with no reduction of rotational speed below the value necessary to initiate movement of the arm. Consequently, the arm 40 moves from stop 46 to the stop 47 with a snap action, the maximum value of the force differential biasing the arm 40 toward the stop 47 being indicated by the vertical distance between the points 83 and 88 on the line $\theta_{47}$.

Thus, the arm 40 moves between the stops 46 and 47 with a snap action in both directions, the arm moving from the stop 47 to the stop 46 with a snap action whenever the rotational speed of the support 33 increases to a critical value corresponding to the line $F_{55_{max.}}$, and moving from the stop 46 to the stop 47 with a snap action whenever the rotational speed of the support decreases to a critical value corresponding to the line $F_{55_{min.}}$.

The foregoing analysis of the operation of the centrifugally-operated snap-action mechanism of the invention has omitted from consideration the effect of the spring force applied to the arm 40 by the spring blade 59 of the switch 56. The variation of the spring force applied to the arm 40 by the spring blade 59 with variations in the angle $\theta$ is graphically illustrated by the dot and dash line 90 in Fig. 6. Since, as previously discussed, a clearance is preferably provided between the arm 40 and the plunger 71 when the arm is in engagement with the stop 47, the line 90 intersects the horizontal axis of the graph at a point between the vertical lines $\theta_{46}$ and $\theta_{47}$. The value of the spring force applied to the arm 40 by the spring blade 59 reaches a maximum when the arm 40 is in engagement with the stop 46, i. e., at the point of intersection of the line 90 with the vertical line $\theta_{46}$. The spring forces represented by the line $F_{51}$ and the line 90 are additive so that the latter has the effect of decreasing the force differential which biases the arm 40 toward the stop 46 and of increasing the rotational speed of the support 33 at which the arm 40 snaps from the stop 46 into engagement with the stop 47. From the foregoing, it is thought that the effects of the spring force applied by the spring blade 59 will be apparent so that any further discussion thereof will be unnecessary.

Figure 7:
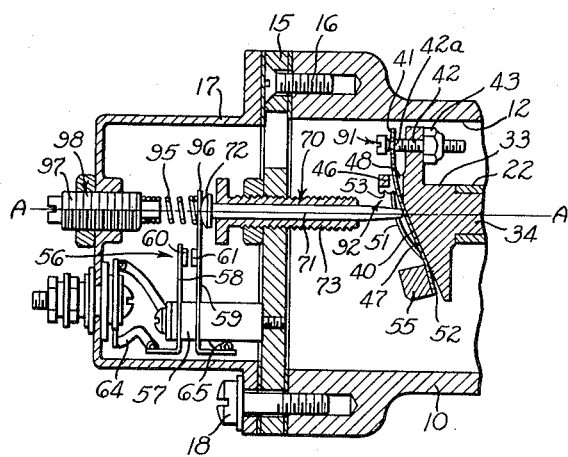
Fig. 7 is a fragmentary sectional view similar to Fig. 1 but illustrating another embodiment of the invention.

The foregoing analysis has likewise disregarded the force applied to the arm 40 which is occasioned by bowing thereof as shown in Figs. 1 and 7. As stated hereinbefore, the support 33 may have its surface formed in a manner to eliminate the bowed effect of the arm 40. In such an event the operation of the snap-action mechanism would be substantially as described in the foregoing analysis. If, however, the mechanism is constructed as shown in Figs. 1 and 7, then an additional force due to the bowing of the leaf spring comprising a portion of the arm 40 will enter into the analysis of the operation of the mechanism. Such additional force is represented in Fig. 6 by the dashed line 99. It is apparent that the value of such a force is additive to the centrifugal forces $F_{55_{max.}}$ and $F_{55_{min.}}$, and is a maximum when the arm 40 engages the stop 47.

In the embodiment of the invention presently under consideration, two adjusting means 91 and 92 are provided for varying the critical speed at which the arm 40 snaps from engagement with the stop 47 into engagement with the stop

46. The adjusting means 91 consists of the screw 42 to which the arm 40 is pivoted. As will be apparent, moving the point of pivotal connection of the arm 40 to the support 33 inwardly or outwardly by means of the screw 42 varies the maximum values of both $\phi$ and $\theta$ to vary the critical speed at which the arm snaps from engagement with the stop 47 into engagement with the stop 46. The adjusting means 92 comprises a plurality of the notches 53 for the springs 51. As will be apparent, shifting the springs 51 from one pair of the notches 53 to another also varies the maximum values of both $\phi$ and $\theta$ to vary the critical speed at which the arm 40 snaps from engagement with the stop 47 into engagement with the stop 46.

The embodiment of my invention which is illustrated in Fig. 7 is substantially identical to that discussed previously and identical reference numerals are employed to designate corresponding components. The embodiment of Fig. 7 differs from that previously described in that the plunger 71 is shown as constantly in engagement with the arm 40 of the snap-action mechanism and is biased into engagement with the arm 40 by a compression spring 95 which is seated against an extension 96 of the switch blade 59. The spring force applied to the arm 40 through the plunger 71 by the spring 95 may be varied by means of a screw 97 against which one end of the spring 95 is seated. The spring force applied to the arm 40 by the spring 95 and the spring force applied thereto by the springs 51 are additive and oppose the centrifugal force applied to the arm upon rotation of the support 33. The effect of the additional spring force provided by the spring 95 is to change the slope of the line $F_{51}$ discussed previously. Also, unless the spring force provided by the spring 95 drops to zero when the arm 40 engages the stop 47, it also has the effect of shifting the line $F_{51}$ bodily along the horizontal axis of the graph of Fig. 6. The operation of the embodiment of Fig. 7 is similar to that described previously and will not be discussed in detail.

The embodiment of Fig. 7 provides a third adjusting means 98 for varying the critical speed at which the arm 40 snaps from engagement with the stop 47 into engagement with the stop 46, the adjusting means 98 being the screw 97. As will be apparent, the position of the screw 97 may be adjusted to adjust the spring force applied to the arm 40 by the spring 95, thereby varying the aforementioned critical speed. It is also apparent that if the embodiment of Fig. 7 were so constructed that the plunger 71 did not constantly engage the arm 40, then it would be possible to adjust the switch to change only the lower speed at which the arm 40 moves from the stop 46 to the stop 47, i. e., adjustment of screw 97 would vary the differential between the cut-out and cut-in speeds of the snap-switch mechanism without changing the upper, cut-out speed.

Thus, the present invention provides a centrifugally-operated mechanism which operates with a snap-action as soon as the rotational speed attains either a maximum or a minimum critical value. I have disclosed my centrifugally-operated snap-action mechanism as used to actuate a switch, but it will be understood that it may be employed to actuate other elements as well. Various other changes, modifications and substitutions may be incorporated in the specific embodiments disclosed without departing from the spirit of the invention.

I claim as my invention:

1. In combination: a support providing an axis of rotation; an arm pivotally connected at one end to said support on one side of said axis; a weight carried by said arm on the opposite side of said axis, the resultant center of gravity of said weight and said arm and said one end of said arm lying on a reference line making an angle of less than 90° with said axis so that rotation of said support results in the application to said weight of a centrifugal force which biases said arm toward one end of said axis; and a leaf spring in compression connected to said arm on said opposite side of said axis and pivotally connected to said support on said one side of said axis for biasing said arm toward the opposite end of said axis in opposition to the action of said centrifugal force.

2. In combination: a support having an axis of rotation; an arm pivotally connected at one end to said support at one side of said axis and extending to the opposite side thereof; means including two stops carried by said support and respectively disposed on opposite sides of said axis of rotation and also on opposite sides of said arm for limiting movement of said arm relative to said support; spring means connected to said arm and said support for applying to said arm a spring force which biases it toward one of said stops; and adjusting means for shifting the point of pivotal connection of said one end of said arm to said support.

3. In combination: a support having an axis of rotation; an arm pivotally connected at one end to said support at one side of said axis, said arm extending to the opposite side thereof; means including two stops carried by said support and respectively disposed on opposite sides of said arm for limiting movement of said arm relative to said support; spring means under compression connected to said arm and said support for applying to said arm a spring force which biases it toward one of said stops; and adjusting means for varying the point of connection of said spring means to said support.

4. In a mechanism of the class described: a support having an axis of rotation; an arm pivotally connected at one end to said support, said connection being at one side of said axis and said arm extending to the opposite side thereof; spring means connected to said arm and said support for applying to said arm a spring force which biases it in one direction; and spaced connection points for varying the point of connection of said spring means to said support.

5. In mechanism of the class described: a support having an axis of rotation, said support having a plurality of notches spaced longitudinally relative to said axis; an arm pivotally connected at one end to said support and at one side of said axis, said arm extending to the opposite side thereof; stop means for limiting movement in one direction of said arm relative to said support; and spring means connected to said arm and having one end received in one of said notches for applying to said arm a spring force which biases said arm toward said stop means, said one end of the spring means being receivable in the other of said notches for varying the point of connection thereof relative to the support.

6. In mechanism of the class described: a support having an axis of rotation; a resilient arm pivotally connected at one end to said support, said end being at one side of said axis and said arm extending to the opposite side thereof;

means, including two stops, carried by said support and respectively disposed on opposite sides of said arm for limiting movement of said arm relative to said support; and spring means connected to said arm and said support for applying to said arm a spring force which biases said arm against the resilience of said arm toward one of said stops so that said arm is under compression.

7. In mechanism of the class described: a support having an axis of rotation; an arm pivotally connected at one end to said support and free to move relative to said support at its other end, the free end of said arm being at one side of said axis and being adapted to move in one direction under the influence of centrifugal force when the support is rotated; resilient means under compression for biasing said arm in the other direction and putting said arm under longitudinal tension; stop means limiting the movement of the arm in said other direction so that said arm is disposed at an angle of less than 90° relative to said axis when engaging said stop, said resilient means and said arm being arranged so that said arm has a tension center line and said arm being adapted to pass from one side of said line to the other with a snap-action; and stop means limiting the movement of said arm under the influence of centrifugal force, said stop means being located adjacent said center line.

8. In mechanism of the class described: a support having an axis of rotation; an arm pivotally connected at one end to said support and free to move relative to said support at its other end, the free end of said arm being at one side of said axis and being adapted to move in one direction under the influence of centrifugal force when the support is rotated; resilient means under compression for biasing said arm in the other direction and putting said arm under longitudinal tension; stop means limiting the movement of the arm in said other direction so that said arm is disposed at an angle of less than 90° relative to said axis when engaging said stop, said resilient means and said arm being arranged so that said arm has a tension center line and said arm being adapted to pass from one side of said line to the other with a snap-action; and stop means limiting the movement of said arm under the influence of centrifugal force short of said center line.

9. In mechanism of the class described for actuation of an electrical switch: a support having an axis of rotation; an arm pivotally connected at one end to said support and free to move relative to said support at its other end, the free end of said arm being at one side of said axis and being adapted to move in one direction under the influence of centrifugal force when the support is rotated; resilient means under compression for biasing said arm in the other direction and putting said arm under longitudinal tension; stop means limiting the movement of the arm to said other direction so that said arm is disposed at an angle of less than 90° relative to said axis when engaging said stop, said resilient means and said arm being arranged so that said arm has a tension center line and said arm being adapted to pass from one side of said line to the other with a snap-action; actuatable means actuated by said arm; and stop means limiting the movement of said arm under the influence of centrifugal force, said stop means being so located adjacent said center line.

References Cited in the file of this patent

UNITED STATES PATENTS

| Number | Name | Date |
| --- | --- | --- |
| 1,017,571 | Lowwenstein | Feb. 13, 1912 |
| 2,170,748 | Eaton | Aug. 22, 1939 |
| 2,246,724 | Eaton | June 24, 1941 |
| 2,381,931 | Shepard et al. | Aug. 14, 1945 |
| 2,518,478 | Kohl | Aug. 25, 1950 |